Patented June 19, 1951

2,557,703

UNITED STATES PATENT OFFICE 2,557,703

PRODUCTION OF NITRILES

Leo J. Spillane, Rockaway Township, Morris County, and William Gilbert Kayser, Jr., Morristown, N. J., assignors to Allied Chemical & Dye Corporation, New York, N. Y., a corporation of New York No Drawing. Application April 25, 1949, Serial No. 89,558

8 Claims. (Cl. 260—465.1)

This invention relates to production of nitriles, in particular propionitrile and isobutyronitrile and the corresponding unsaturated nitriles, acrylonitrile and methacrylonitrile.

It is known to obtain nitrile by reaction of ammonia with various starting materials, such as olefins, alcohols, aldehydes and acids. Some of these starting materials are not easily available, especially those containing 3 or more carbon atoms. Others give relatively low yields of nitriles, or if the yields are good per pass, the conversion of starting material to nitriles per pass is low.

Objects of the present invention are to produce saturated and unsaturated nitriles containing three or more carbon atoms, especially propionitrile, acrylonitrile, isobutyronitrile and methacrylonitrile from the readily available corresponding olefin oxides in high yields and conversions per pass. Other objects and advantages will appear hereinafter.

In accordance with our invention, ammonia and an olefin oxide of the group consisting of propylene oxide and isobutylene oxide, in at least a 1:1 mol ratio of ammonia: olefin oxide, are passed through a bed of large surface area chromia or molybdena catalyst maintained at temperatures reaching about 475° C. to 700° C. in the hottest part of the catalyst bed. Under these conditions the olefin oxide and ammonia react with elimination of water and hydrogen to form nitriles of the same carbon content as the starting olefin oxide. At higher temperatures in the given range, the nitrile products include significant amounts of unsaturated nitriles. The products may be individually recovered by fractionation or other usual methods of separation.

According to a preferred embodiment of the process, whereby highest yields are obtained, temperatures at the inlet to the catalyst bed are below about 400° C.

The principal factors to be controlled in our process are temperature and catalyst. We use temperatures reaching at least about 475° C. in the hottest part of the catalyst bed. Temperatures in the hottest part of the catalyst bed between about 500° C. and about 700° C. result in rapid and complete reaction of the olefin oxide in one pass with good yields of nitriles. The yields of nitriles obtainable with temperatures at the inlet to the catalyst zone below about 400° C. and temperature maxima of about 500° C. to about 625° C. are of the order of 80% or better based on the olefin oxide starting material. With maximum temperatures near 500° C., the nitrile product is largely saturated, but with temperatures of 600° C. and above a significant quantity of the product is the unsaturated nitrile, acrylonitrile or methacrylonitrile. If temperatures throughout the catalyst zone are uniformly high, e. g. about 600° C.-630° C. throughout the catalyst zone, little nitrile product is obtained.

We have found that the nature of the catalyst employed considerably influences the yields of nitrile products, some metal oxide catalysts producing reaction of the olefin oxide but giving little or no nitrile product. Specific catalysts which we have found give excellent yields are large surface area chromia catalysts and large surface area molybdena catalysts.

The catalysts must have a form presenting large surface area in order to be effective for our reaction, we have found. These large surface area catalysts may be prepared in any of the ways usual for such catalysts, e. g. by supporting the chromia or molybdena on a porous support such as diatomaceous earth or activated alumina or by precipitating a gel from a solution containing a dissolved compound of the catalytic element and converting the gel with heating, and reduction if necessary, to the finished metal oxide catalyst compound.

The molybdena catalysts are distinguished from chromia catalysts by a greater tendency to promote formation of unsaturated nitriles at the lower temperatures in our range.

Space velocities may be maintained at any convenient values as the nitrile products are not highly reactive under the conditions of reaction. Suitable values are above about 300 reciprocal hours based on volume of input ammonia and olefin oxide vapors under standard conditions and volume of the catalyst bed (i. e. volume apparently occupied by the catalyst).

The ammonia reactant should be present in at least 1:1 mol ratio with the olefin oxide reactant and preferably is present in excess. Best yields are obtained with mol ratios of ammonia:olefin oxide of about 3:1 or more.

The following examples illustrate our invention but are to be interpreted as illustrative only and not in a limiting sense.

Space velocities in the examples are based on volume of input ammonia and olefin oxide vapors under standard conditions and volume apparently occupied by the catalyst (volume of the catalyst bed).

*Example 1.*—Ammonia and isobutylene oxide in a mol ratio of 5:1.18 were passed through a bed of chromia gel catalyst maintained with a temperature gradient increasing from 380° C. at a point one inch above the catalyst bed to 497° C. at the hottest part of the catalyst bed. The space velocity was 550 cc. of ammonia and isobutylene oxide vapors (S. T. P.) per hour per cc. of catalyst bed volume.

By fractionation of the products isobutyronitrile was recovered in 80% of the theoretical yield based on the starting isobutylene oxide.

*Example 2.*—Ammonia and isobutylene oxide in a mol ratio of 2.3:0.37 were passed through a bed of molybdena catalyst supported on powdered diatomaceous earth (15 weight per cent $MoO_2$). The temperature gradient increased from 333° C. one inch above the catalyst bed to 506° C. in the hottest part of the catalyst bed. The space velocity was 435 reciprocal hours.

Yield of nitriles was 72% of theory based on the starting isobutylene oxide. The nitrile product contained some methacrylonitrile as well as isobutyronitrile. When in the procedure of the above Example 2, a molybdena on activated alumina catalyst (90 weight per cent $MoO_2$) was substituted for molybdena on diatomaceous earth, the yield of nitrile product was about 60% of theory based on the starting isobutylene oxide.

*Example 3.*—Ammonia and isobutylene oxide in a mol ratio of 1.6:0.53 were passed through a bed of chromia gel catalyst supported on powdered diatomaceous earth. The temperature gradient increased from 372° C. one inch above the catalyst bed to 626° C. in the hottest part of the catalyst bed. Nitrile product containing about 13 mol per cent of methacrylonitrile, the rest isobutyronitrile, was obtained in yield of 62% based on the starting isobutylene oxide.

*Example 4.*—When ammonia and propylene oxide in a mol ratio of 3.6:1.5 of ammonia:propylene oxide were passed through a chromia gel catalyst bed maintained at graduated temperatures reaching 489° C. maximum, at a space velocity of 700 reciprocal hours, a yield of propionitrile of about 60% based on the propylene oxide starting material was obtained, plus 2.5 mol per cent on propylene oxide (4% by weight of the nitrile products) of acrylonitrile.

Although in the examples the supporting materials used for the chromia and molybdena catalysts are diatomaceous earth and the porous, granular aluminum oxide known as activated alumina, other materials of large surface area may be used with similar results. The results obtained vary to some extent with the supporting material employed and diatomaceous earth represents a particularly advantageous supporting material.

We claim:

1. A process for production of nitriles which comprises passing ammonia and an olefin oxide of the group consisting of propylene oxide and isobutylene oxide, in at least a 1:1 mol ratio of ammonia:olefin oxide, through a bed of large surface area catalyst of the group consisting of chromia catalysts and molybdena catalysts, maintained at temperatures reaching between about 475° C. and 700° C. in the hottest part of the catalyst bed.

2. A process as defined in claim 1 wherein the temperature at the inlet to the catalyst bed is below about 400° C., the maximum temperature in the catalyst bed is between about 500° C. and about 625° C., the mol ratio of ammonia:olefin oxide is at least about 3:1 and the space velocity based on volume of the input ammonia and olefin oxide vapors under standard conditions and volume of the catalyst bed is at least about 300 reciprocal hours.

3. A process as defined in claim 2 wherein the catalyst employed is chromia gel.

4. A process as defined in claim 2 wherein the catalyst employed is chromia gel supported on diatomaceous earth.

5. A process as defined in claim 2 wherein the catalyst employed is molybdena supported on diatomaceous earth.

6. A process as defined in claim 3 wherein the olefin oxide employed is isobutylene oxide and the maximum temperature reached is about 500° C.

7. A process as defined in claim 3 wherein the olefin oxide employed is propylene oxide and the maximum temperature reached is about 500° C.

8. A process as defined in claim 5 wherein the olefin oxide employed is isobutylene oxide and the maximum temperature reached is about 600° C.

LEO J. SPILLANE.
W. GILBERT KAYSER, Jr.

REFERENCES CITED

The following references are of record in the file of this patent:

UNITED STATES PATENTS

| Number | Name | Date |
| --- | --- | --- |
| 2,337,421 | Spence et al. | Dec. 21, 1943 |
| 2,337,422 | Spence et al. | Dec. 21, 1943 |
| 2,487,299 | Bixhop et al. | Nov. 8, 1949 |
| 2,500,256 | Mahan | Mar. 14, 1950 |

OTHER REFERENCES

Krassousky, Compt. rend. (Fr. Acad.), vol. 146, pp. 236–239 (1908).